No. 673,763. Patented May 7, 1901.
J. A. CRAIG.
BELT SHIPPER.
(Application filed Oct. 1, 1900.)
(No Model.)
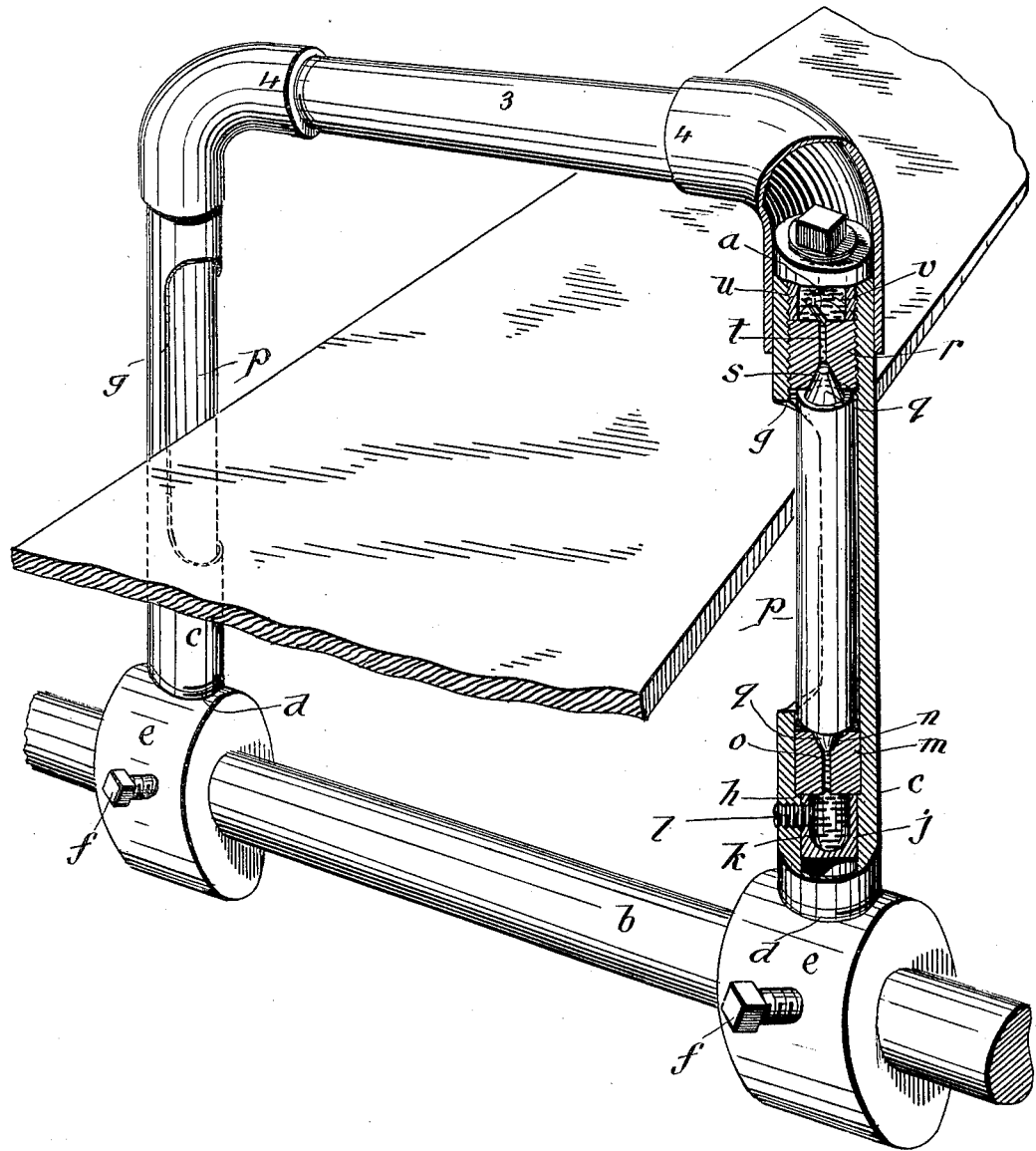
Witnesses
R. a. c. Kimber
JAMES A. CRAIG
Inventor
By his Attorney

UNITED STATES PATENT OFFICE.

JAMES ARCHIBALD CRAIG, OF SPRINGFIELD, ILLINOIS, ASSIGNOR OF ONE-HALF TO RICHARD MONTAGUE DAVY, OF MONTREAL, CANADA.

BELT-SHIPPER.

SPECIFICATION forming part of Letters Patent No. 673,763, dated May 7, 1901.

Application filed October 1, 1900. Serial No. 31,685. (No model.)

*To all whom it may concern:*

Be it known that I, JAMES ARCHIBALD CRAIG, of the city of Springfield, in the State of Illinois, but temporarily residing in the city of Montreal, Province of Quebec, Canada, have invented certain new and useful Improvements in Belt-Shippers; and I do hereby declare that the following is a full, clear, and exact description of the same.

My invention has for its object to provide a noiseless and self-oiling belt-shipper and one that will be more effective and less liable to get out of order and less costly than belt-shippers heretofore known.

The invention may be said briefly to consist of a pair of spindles each recessed to receive an elongated roller which bears, preferably, in a pair of automatically-lubricated bearings, said spindles being adapted to be mounted upon the shipper-rod, one on each side of the belt and with said elongated rollers located adjacent to said belt, while a bridge-piece is preferably connected at its ends to the outer ends of said spindles to space them relatively to one another and at the same time prevent the belt jumping from between them. For full comprehension, however, of my invention reference must be had to the accompanying drawing, forming a part of this specification, wherein my improved belt-shipper is shown in perspective view, partly in section.

The shipper-rod $b$ is and may be of usual form.

My improved shipper-fingers are constructed and secured to the shipper-rod as follows: A pair of hollow spindles $c$, each preferably consisting of a short length of pipe, has the exterior of one end screw-threaded, as at $d$, to take into a tapped boring in the side of a collar $e$, secured rigidly upon the shipper-rod by a set-screw $f$. One side of each hollow spindle is cut away, as at $g$, and the interior thereof is increased in bore from the outer end thereof to within a short distance of the inner end to form a shoulder $h$, while the outer end of the interior is tapped to the adjacent end of the side opening. A plug $j$, formed with a cavity $k$, is driven into each spindle to a position just inside of the shoulder $h$, where it will be jammed and further held against displacement by a screw $l$, taking through a tapped boring in the sides of the spindle and plug. A bearing-block $m$, formed with a conical recess $n$ and a channel $o$, is driven against the shoulder $h$, upon which it is seated. An elongated roller $p$, having diminished truncated conical ends $q$, bears at one end in the bearing-block just mentioned and at its other end in a corresponding block $r$, having a conical recess $s$ and channel $t$. This latter bearing-block has its perimeter screw-threaded and takes into the tapped outer end of the hollow spindle to receive the opposite conical end of the roller, while a plug $u$, formed with a cavity $v$ and with its perimeter screw-threaded, takes into the extreme end and is squared at its outer end to enable it to be screwed into or out of place, while the outer end of the last-mentioned bearing-block is transversely grooved, as at $a$, to afford a catch for a screw-driver. A bridge-piece braces the outer ends of the spindles together and consists of a rod 3, oppositely screw-threaded at its ends to take into one end 4, which is tapped, of each of a pair of elbows, the other ends whereof are jammed upon the ends of the spindles.

Before the parts are assembled together I fill the cavities in the plugs with a thick lubricant, such as axle-grease, which will not run unless the bearing-blocks become heated, when it will ooze through the channels and lubricate the bearings.

I prefer to construct the bearing-blocks of lignum-vitæ or other hard wood, as it absorbs the lubricant to a certain extent, thus rendering the shipper perfectly noiseless.

What I claim is as follows:

1. A belt-shipper finger consisting of a hollow spindle, an elongated roller located in said hollow spindle, the side of said hollow spindle being cut away to expose said roller, means for localizing said roller relatively to the opening formed by said cut-away portion; and means for securing said finger to the shipper-rod substantially as and for the purpose set forth.

2. A belt-shipper finger consisting of a hollow spindle, an elongated roller located in said hollow spindle, the side of said hollow spindle being cut away to expose said roller; means for localizing said roller relatively to the opening formed by said cut-away portion; means for lubricating said roller; and means for securing said finger to the shipper-rod substantially as and for the purpose set forth.

3. A belt-shipper finger consisting of a hollow spindle having an opening in one side, a roller located in said hollow spindle and a pair of absorbent bearing-blocks located in said spindle and receiving the ends of said roller, and a lubricant-carrier located within said spindle adjacent to each bearing-block, substantially as described and for the purpose set forth.

4. A belt-shipper finger consisting of a hollow spindle having an opening in one side, a roller located in said hollow spindle and of slightly-greater length than said opening, a pair of absorbent bearing-blocks located in said spindle and receiving the ends of said roller, and a lubricant-carrier located within said spindle adjacent to each bearing-block, substantially as described and for the purpose set forth.

5. A belt-shipper consisting of a pair of fingers each consisting of a hollow spindle, having an elongated opening in one side thereof, a roller located within said spindle and of slightly-greater length than said opening; a pair of bearing-blocks located within said spindle and each formed with a conical recess and a channel; a pair of plugs located within said spindle adjacent to said bearing-blocks and formed each with a cavity; a bridge-piece for connecting the outer ends of said fingers together; and means for securing said fingers to the shipper-rod substantially as described and for the purpose set forth.

In testimony whereof I have affixed my signature in presence of two witnesses.

JAMES ARCHIBALD CRAIG.

Witnesses:
WILLIAM P. McFROST,
FRED. J. SEARS.